March 14, 1950 — R B. WORDEN — 2,500,445
FISHING REEL
Filed Feb. 27, 1945 — 2 Sheets-Sheet 2

Inventor
R. B. Worden
By Wilfred E. Lawson
Attorney

Patented Mar. 14, 1950

2,500,445

UNITED STATES PATENT OFFICE 2,500,445

FISHING REEL

R. B. Worden, Granger, Wash.

Application February 27, 1945, Serial No. 579,941

5 Claims. (Cl. 242—96)

This invention relates generally to line winding reels and pertains particularly to a reel designed for use in fishing.

An object of the invention is to provide a line reel having a fixed conical drum upon which the line is wound, with means revolving around and co-axially with the drum for laying the line on the drum smoothly and evenly.

Another object of the invention is to provide a fishing line winding and unwinding reel having a fixed drum and a rotary line winding device by which the line is carried around the drum and laid thereon, with means carried by the rotary means for applying a tension to the line as it is wound up or paid out.

The invention will be best understood from a consideration of the following detailed description taken in connection with the accompanying drawing forming a part of this application, with the understanding, however, that the invention is not confined to a strict conformity with the showing of the drawings but may be changed or modified so long as such changes or modifications mark no material departure from the salient features of the invention as expressed in the appended claims.

In the drawings:

Figure 4 is a detail view of the pivoted spring controlled line guide finger.

Figure 5 is a detail view partly in section and partly in elevation of the friction drag and clutch.

Figure 6 illustrates a modified form of the invention, designed to be mounted or fixed upon a fixed supporting structure.

Figure 7 is a sectional view taken on the line 7—7 of Figure 5.

Figure 1:
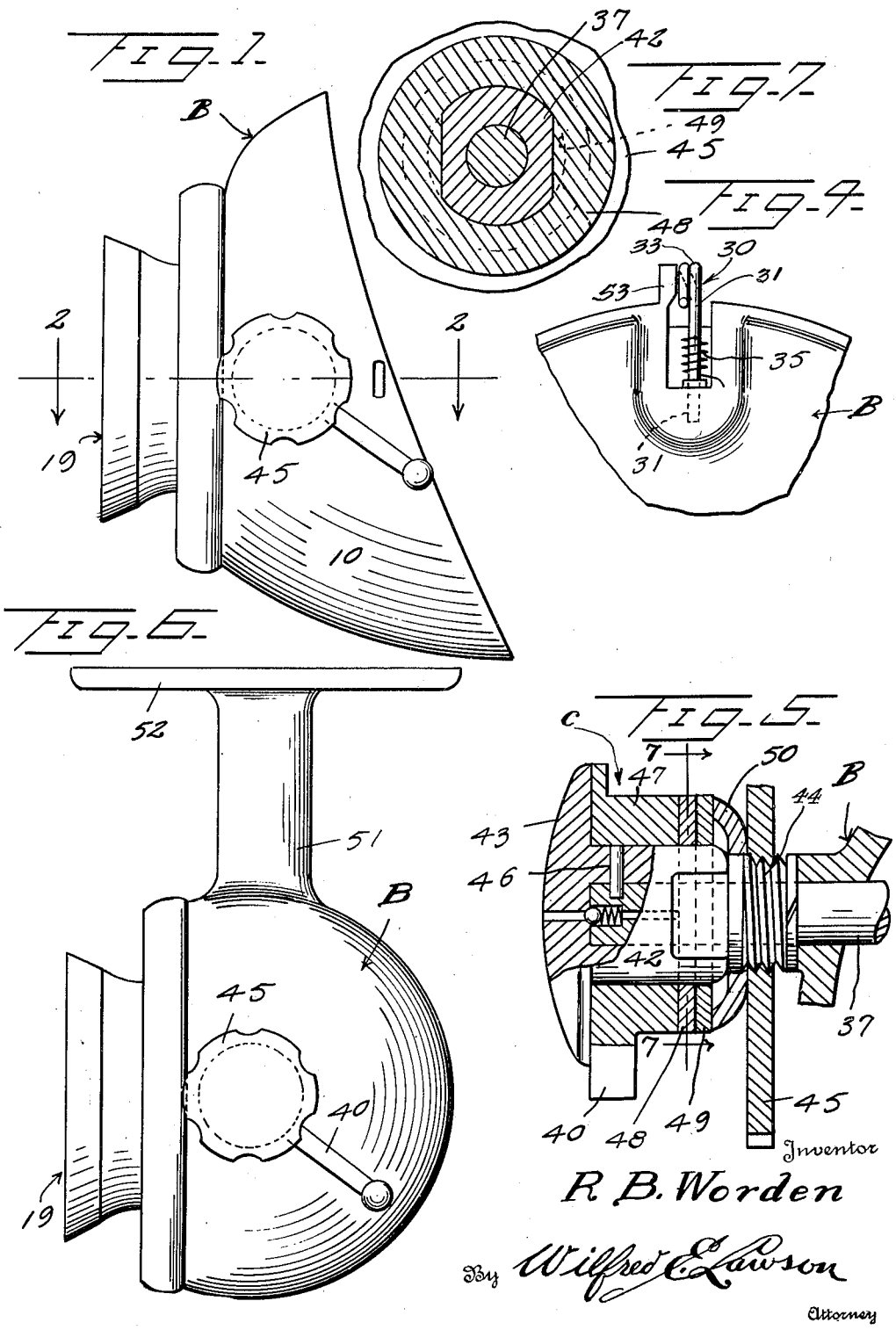
Figure 1 is a view in side elevation of a reel constructed in accordance with the present invention.

Referring now more particularly to the drawings wherein like numerals of reference designate corresponding parts throughout the several views, the reference character "B" generally designates the body portion of the reel structure. This body portion is in the form of a hollow, circular shell, the side wall of which is generally designated 10 while the back wall is designated 11 and is of dished form, the outer side being concave to set against the front of the body. In addition the back wall 11 curves downwardly and rearwardly across the axial center of the body so that the body at the top is of less width from the front edge to the rear edge than at the bottom as shown in Figure 1.

As previously stated the body B is hollow or in the form of a shell and the front side of the body is open, such open side being of circular form and designated 12.

Figure 2:
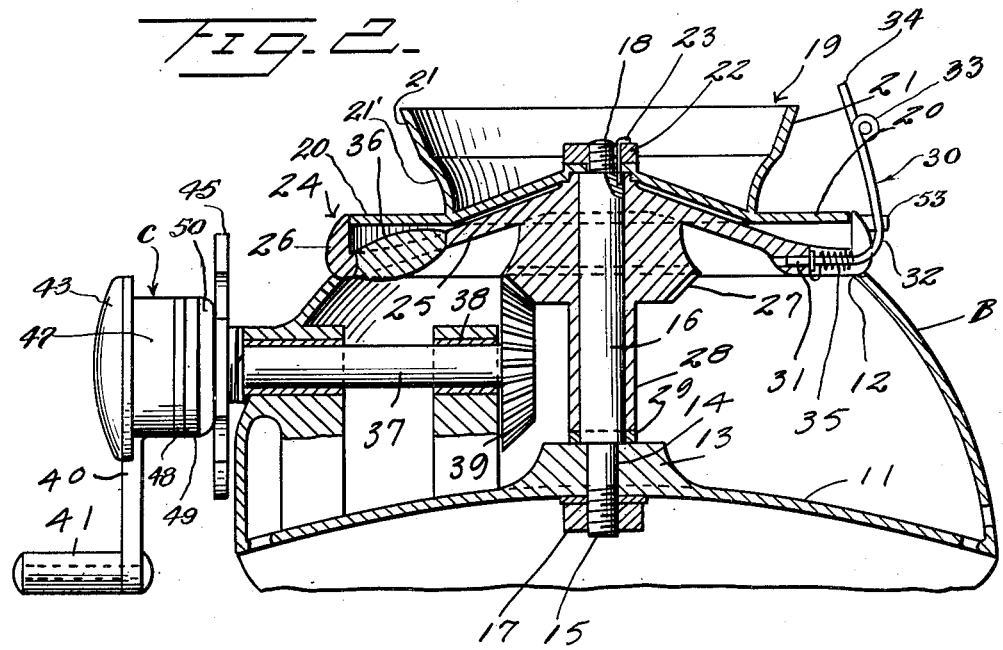
Figure 2 is a sectional view taken substantially on the line 2—2 of Figure 1.
Figure 3:
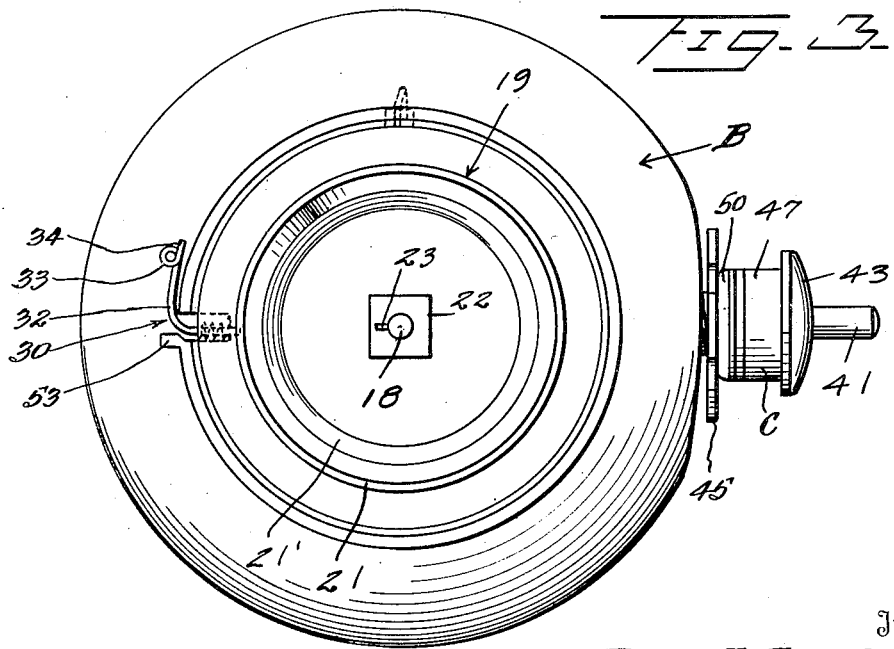
Figure 3 is a view in front elevation of the device.

Upon the inner side of the back wall 11 there is formed upon the axial center of the body, the boss 13 which has an axial opening 14 therethrough, through which extends the reduced stem portion 15 of the fixed arbor 16. The end of the stem 15 is threaded to receive the securing nut 17 by which it is maintained rigidly in position so that the arbor 16 extends through the body and through the opening 12 beyond the opening as shown in Figure 2. The outer or forward end of the arbor is also reduced and screw threaded as indicated at 18.

Fixed upon the forward end of the arbor is the line receiving drum which is generally designated 19. This drum comprises an annular disk or plate portion 20 to which is concentrically fixed the outwardly flaring circular flange 21, the over-all diameter of which is materially less than the over-all diameter of the plate 20 as shown.

The inner half of this flange is depressed as indicated at 21' so that there is provided an annular depressed area in which the bulk of the line is wound and, as shown in Figure 2, the plane of the outer face of the rim forms an acute angle with the plane of the top face or surface of the plate 20.

Within the flange 21 the plate is pressed outward slightly to form a shallow cone and at the center or apex of this cone is an opening to receive the stem 18 of the arbor, and upon this stem is threaded the nut 22.

This nut is suitably locked to the arbor as, for example, by the use of a lock washer, not shown, or a key 23, so that relative rotary movement between the arbor and the drum is prevented.

Lying behind the plate portion 20 of the drum 19 is a revolvable disk or wheel which is generally designated 24. This disk comprises the main body portion 25 and a low peripheral flange portion 26 and the diameter of the body portion 25 is substantially the same as the diameter of the opening 12 in the body so that this opening is closed by the disk when the latter is installed in working position behind the drum, as shown in Figure 2.

Formed integral with the underside of the body portion 25 of the disk is a bevel or miter gear 27 and this in turn is formed integral with a sleeve 28. The sleeve 28 is designed to receive the arbor 16 and the bore of the sleeve is continued through the body of the gear 27 for the same purpose, so that the disk may be rotatably mounted upon the arbor as shown. The inner end of the sleeve 28 is supported by the boss 13 and there may be interposed between the boss and the end of the sleeve, a bearing washer 29.

Fixed in the periphery of the disk 24 is the line guide finger which is generally designated 30. This finger comprises a stem portion 31 which is rotatably supported in the disk to extend radially from the periphery. The outer end of the stem merges with an arcuate portion 32 which is curved back toward the periphery of the disk and this arcuate portion terminates in a loop or eye 33 which in turn merges with a terminal tail-piece 34. The tail-piece 34 has a longitudinal curvature generally corresponding to the curvature of the portion 32 and these parts together with the stem 31 all lie in the same plane so that when the stem is oscillated in one direction the parts 32, 33 and 34 will swing backward toward the disk and close to the top of the disk. When a line is run through the eye and the disk 24 is revolved, there is a pressure or pull on the finger tending to pull it forward. The line guide finger is normally maintained in the backward swung position by a coil spring 35 which surrounds the stem 31 and has one end attached to the stem and the other end bearing against an adjacent part of the disk as shown in Figure 2.

Diametrically opposite from the guide finger 30, the disk 24 carries a weight 36. The action of this weight is as follows:

When the line is being wound in and the angler stops and makes a cast, the weight 36, regardless where it may be, causes the finger carrying disk to turn so that the finger is brought into proper position to attach the line after the catch is made. To accomplish this the weight must naturally swing downwardly to the lowest position, so that the hand of the finger carrying the eye is a little to the left of top center, or to the right of top center, if a left handed man is using the reel.

In the body B is mounted an operating shaft 37, such shaft being supported in suitable bearings 38 and extending through the wall of the body to the exterior thereof. Upon the inner end of this shaft 37 is a bevel or miter gear 39 which is in mesh with the gear 27 as shown.

The outer end of the shaft 37 has connected therewith through a friction drag clutch, generally designated C, an arm 40 carrying a handle 41.

The drag clutch C comprises a hub portion 42, the outer end of which is formed to provide the relatively large oval head 43 the inner side of which is smooth. The inner end is reduced slightly in diameter and is externally threaded as indicated at 44 to receive the star wheel 45 which is threaded thereon and which is manipulated to increase or decrease the friction action of the clutch.

The center of the hub 42 is bored, from its smaller threaded end, to receive the drive shaft 37 and is secured to the drive shaft by the pin 46.

The crank handle or arm 40 is formed integral with the collar 47 and the outer end or side of this collar bears against the head 43 of the hub while the inner end forms a clutch face which co-acts with a clutch disk 48 which is supported upon the hub against rotation relative to the hub. As will be readily apparent the handle collar 47 may turn on the hub if the pressure of the clutch disk 48 against the inner face thereof is light but if such pressure is increased so that the frictional contact between the inner face of the collar and the disk 48 becomes great then the turning of the collar will impart rotary motion to the shaft, through the hub 42 which is locked to the shaft.

Upon the inner side of the clutch disk 48 is a free moving washer 49 and interposed between this washer and the star wheel 45 is a spring washer 50, one side of which bears against the washer 49 while the opposite side has the star wheel 45 pressed thereagainst. By turning the star wheel 45 in one direction it may be threaded outwardly on the threaded reduced portion 44 of the hub 42 so as to compress the spring washer and increase the frictional engagement between the clutch disk 48 and the inner face of the collar 47 and by turning the star wheel in the opposite direction this frictional engagement may be reduced so that slippage may occur between the turning crank and the shaft 37.

In the modified embodiment of the invention shown in Figure 6, the body of the reel is generally designated B' and this has the back half substantially semi-circular as shown and such body portion also has formed integral therewith the post 51 which in turn is integral with a mounting plate 52. This construction is provided to be mounted upon the ceiling of a boat deck awning or upon any other suitable fixed support so that the angler will not have to carry the reel on his body. Except for these changes the reel structure is the same as that shown in Figures 1 to 5 inclusive.

In the use of the reel the line passes through the eye 33 of the guide finger and is then attached to the drum 19. When the operating crank 40 is turned rotary motion will be imparted to the disk 24, carrying the finger 30 around the drum. As the disk turns and pull is applied to the line, the finger will swing outwardly so that the eye will be axially directed during the time that it is being moved around the drum. As soon as the tension is relaxed on the line the spring actuated guide will swing back to its former position upon the disk.

In order to limit the outward swinging of the guide finger there is formed or placed at one side of the curved outer end 32 of the finger stem, upon the disk, the stop member 53. The arcuate portion 32 of the guide finger strikes against this stop when the finger has oscillated to a position where the eye is extending directly outwardly or axially with respect to the disk and drum.

By mounting the reel structure upon his person or upon a fixed structure, the angler frees his rod of a weight which would make prolonged fishing tiresome. In addition, casting may be accomplished with greater ease and freedom, with the present device, and longer casts may be made with light lures, or with the use of lighter weights, than is possible when the rod is weighted with a reel containing many yards of line, which may be wet.

Casting may be accomplished, also, without danger of snarling the line and winding may be done smoothly with even winding of the line on the drum as the position of the pivoted finger may be continuously varied by raising and lowering the fishing pole tip so as to cause the line to vary its pull upon the finger.

In Figure 2 the line guide finger 30 is shown in the outward position which it assumes when the line is being stripped from the drum 19 and when it is being wound up thereon. As previously stated, when the line is slack the guide finger will be oscillated inwardly into the plane of the periphery of the disk 24, by the spring 35. In swinging outwardly its movement will be limited to the vertical position by the stop lug or member 53.

While the reel has been illustrated and described as designed for attachment to the body, it is to be understood that it is within the scope and intention of the present invention to form the body of the reel so that it may be mounted on the butt of a rod held in the hand. Obviously the only change required for such use is to design the back of the reel for attachment to the butt of the rod in the same manner as reels are at present designed and at the same time to make the reel sufficiently smaller to adapt it to the size and weight of rod with which it is to be used. By such changes the reel may be used on a fly rod, bait rod or salmon rod as desired.

I claim:

1. A line winding reel, comprising a supporting body, a shaft fixed to the body, a line drum supported on the shaft and fixed against rotation, the drum including a circular plate and a flange of smaller overall diameter than the plate and fixed thereto concentric therewith, a wheel rotatably supported on the shaft between the drum plate and the body and having its periphery adjacent to the periphery of the plate, a line guide supported upon the wheel at the periphery thereof for oscillation on an axis radially of the wheel, said line guide including a relatively long eye-carrying portion adapted to be moved upon oscillation of the guide means from a position in which it lies substantially in the plane of the periphery of the wheel to a position in which it extends across the periphery of the drum plate and at an angle inwardly toward the rotational axis line of the drum, and a weight member carried by the wheel diametrically opposite from the line guide and adjacent to the periphery of the wheel.

2. A line winding reel of the character stated in claim 1 in which the wheel carries an integral peripheral flange extending in an axial direction away from the body and encircling the periphery of the drum plate.

3. A line reel, comprising a body member, a shaft fixed at one end to the body member, a drum mounted upon the other end of the shaft, the drum including a circular plate portion and a circular flange concentric with the plate portion and secured to the side face opposite from the body, said flange flaring outwardly from the plate and having an overall diameter materially less than the overall diameter of the plate, a wheel mounted upon the shaft upon the side of the plate opposite from the flange and in close proximity to the plate, the periphery of the wheel substantially coinciding with the periphery of the plate, means for rotating the wheel, a line guide carried by the wheel at the periphery thereof and including a stem portion oscillatably supported on the wheel and extending from the periphery thereof for turning on an axis extending radially of the wheel, the stem at its outer end merging into an arcuate portion which in turn merges with a guide eye, said line guide being oscillatable from a position in which the arcuate portion and eye lie substantially in the plane of the periphery of the wheel to a position in which the arcuate portion extends across the periphery of the plate to position the eye adjacent to the radial outer side of the drum flange on the side of the plate opposite from the wheel, and resilient means connected between the line guide stem and wheel and normally urging oscillation of the stem in a direction to position the arcuate portion and eye substantially in the plane of the wheel periphery.

4. A line reel, comprising a body member, a shaft fixed at one end to the body member, a drum mounted upon the other end of the shaft, the drum including a circular plate portion and a circular flange concentric with the plate portion and secured to the side face opposite from the body, said flange flaring outwardly from the plate and having an overall diameter materially less than the overall diameter of the plate, a wheel mounted upon the shaft upon the side of the plate opposite from the flange and in close proximity to the plate, the periphery of the wheel substantially coinciding with the periphery of the plate, means for rotating the wheel, a line guide carried by the wheel at the periphery thereof and including a stem portion oscillatably supported on the wheel and extending from the periphery thereof for turning on an axis extending radially of the wheel, the stem at its outer end merging into an arcuate portion which in turn merges with a guide eye, said line guide being oscillatable from a position in which the arcuate portion and eye lie substantially in the plane of the periphery of the wheel to a position in which the arcuate portion extends across the periphery of the plate to position the eye adjacent to the radial outer side of the drum flange on the side of the plate opposite from the wheel, and a weight supported upon the wheel in a position diametrically opposite from the line guide to cause the line guide to come to rest at the top of the drum when the wheel stops rotating.

5. A line winding reel comprising a hollow body having an outer wall of substantially semispherical form, said wall having a circular opening therein, the body further including an inner back wall, a shaft fixed at one end to said back wall and extending outwardly therefrom through the center of said circular opening, a wheel supported on the shaft to turn thereabout and having its periphery lying adjacent to and substantially within the circular opening, a drum fixed against rotation upon the outer end of the shaft and including a circular plate and an axially directed flange, the drum flange being of an overall diameter materially less than the plate and flaring outwardly, means carried by the body and operatively coupled with the wheel to impart rotation to the wheel, a line guide oscillatably supported on the wheel at the periphery thereof for turning movement on an axis extending radially of the wheel, said line guide being movable from a position in which it lies substantially in the plane of the periphery of the wheel to a position in which it extends across the periphery of the drum plate, and a weight body secured to the wheel adjacent to the periphery thereof and diametrically opposite from the line guide means to cause the line guide to come to rest at the top of the drum when the wheel stops rotating.

R. B. WORDEN.

REFERENCES CITED

The following references are of record in the file of this patent:

FOREIGN PATENTS

| Number | Country | Date |
| --- | --- | --- |
| 380,939 | Great Britain | Sept. 29, 1932 |
| 418,837 | Great Britain | Nov. 1, 1934 |
| 487,818 | Great Britain | June 27, 1938 |
| 840,575 | France | Apr. 27, 1939 |